United States Patent
Kim et al.

(10) Patent No.: US 10,263,249 B2
(45) Date of Patent: Apr. 16, 2019

(54) CARBON-SILICON COMPOSITE, METHOD OF PREPARING THE SAME, AND ANODE ACTIVE MATERIAL INCLUDING THE CARBON-SILICON COMPOSITE

(71) Applicants: LG Chem, Ltd., Seoul (KR); Korea Advanced Institute Of Science And Technology, Daejeon (KR)

(72) Inventors: Hyun Wook Kim, Daejeon (KR); Ki Tae Kim, Daejeon (KR); Sang Ouk Kim, Daejeon (KR); Won Jun Lee, Daejeon (KR)

(73) Assignees: LG Chem, Ltd. (KR); Korea Advanced Institute Of Science And Technology (KR)

( * ) Notice: Subject to any disclaimer, the term of this patent is extended or adjusted under 35 U.S.C. 154(b) by 974 days.

(21) Appl. No.: 14/096,695

(22) Filed: Dec. 4, 2013

(65) Prior Publication Data
US 2014/0087268 A1    Mar. 27, 2014

Related U.S. Application Data

(63) Continuation of application No. PCT/KR2013/006399, filed on Jul. 17, 2013.

(30) Foreign Application Priority Data

Jul. 20, 2012   (KR) .................. 10-2012-0079567
Jul. 11, 2013   (KR) .................. 10-2013-0081680

(51) Int. Cl.
*H01M 4/36*   (2006.01)
*H01M 4/134*  (2010.01)
(Continued)

(52) U.S. Cl.
CPC ............. *H01M 4/366* (2013.01); *C01B 33/02* (2013.01); *H01M 4/134* (2013.01); *H01M 4/386* (2013.01); *H01M 4/625* (2013.01)

(58) Field of Classification Search
CPC ............................ H01M 4/386; H01M 4/133
See application file for complete search history.

(56) References Cited

U.S. PATENT DOCUMENTS 6,440,610 B1     8/2002   Sheem et al.
2005/0233213 A1  10/2005  Lee et al.
(Continued)

FOREIGN PATENT DOCUMENTS

CN     1819310 A       8/2006
JP     2007-005201 A   1/2007
(Continued)

OTHER PUBLICATIONS

International Search Report from PCT/KR2013/006399, dated Oct. 18, 2013.
(Continued)

*Primary Examiner* — Ula C Ruddock
*Assistant Examiner* — Gregory A Passa
(74) *Attorney, Agent, or Firm* — Lerner, David, Littenberg, Krumholz & Mentlik, LLP

(57) ABSTRACT

Provided are a carbon-silicon composite having improved capacity and cycle stability, and a method of preparing the same. More particularly, the present invention relates to a carbon-silicon composite, in which surfaces of silicon particles are coated with a carbon-based material that is doped with at least one type of doping atoms selected from the group consisting of nitrogen (N), phosphorous (P), boron (B), sodium (Na), and aluminum (Al), and a method of preparing the same.

15 Claims, 7 Drawing Sheets

(51) Int. Cl.
*H01M 4/62* (2006.01)
*C01B 33/02* (2006.01)
*H01M 4/38* (2006.01)

(56) References Cited

U.S. PATENT DOCUMENTS

| | | |
|---|---|---|
| 2008/0166474 A1 | 7/2008 | Deguchi et al. |
| 2008/0193831 A1 | 8/2008 | Mah et al. |
| 2011/0070495 A1 | 3/2011 | Ban et al. |
| 2011/0159367 A1 | 6/2011 | Kim et al. |
| 2012/0100438 A1 | 4/2012 | Fasching et al. |

FOREIGN PATENT DOCUMENTS

| | | |
|---|---|---|
| JP | 2007-311180 A | 11/2007 |
| KP | 1020050090219 A | 9/2005 |
| KP | 1020080076075 A | 8/2008 |
| KR | 1020010055503 A | 7/2001 |
| KR | 1020090063174 A | 6/2009 |
| KR | 1020110079472 A | 7/2011 |
| KR | 1020110132804 A | 12/2011 |
| WO | 2007/094240 A1 | 8/2007 |
| WO | 2011/056847 A2 | 5/2011 |

OTHER PUBLICATIONS

Extended Search Report form European Application No. 13805212.1, dated Dec. 14, 2015.
Yong Jae Cho et al., "Nitrogen-Doped Graphitic Layers Deposited on Silicon Nanowires for Efficient Lithium-Ion Battery Anodes", Journal of Physical Chemistry C, vol. 115, No. 19, May 19, 2011, pp. 9451-9457.
Duck Hyun Lee et al, "Highly Efficient Vertical Growth of Wall-Numbered-Selected, N-Doped Carbon Nanotube Arrays," Nano Letters 2009 vol. 9, No. 4, pp. 1427-1432.

(a)

(b)

CARBON-SILICON COMPOSITE, METHOD OF PREPARING THE SAME, AND ANODE ACTIVE MATERIAL INCLUDING THE CARBON-SILICON COMPOSITE

CROSS-REFERENCE TO RELATED APPLICATION

The present application is a continuation of International Application No. PCT/KR2013/006399, filed Jul. 17, 2013, which claims the benefit of Korean Patent Application No. 10-2013-0081680 filed Jul. 11, 2013, and Korean Patent Application No. 10-2012-0079567 filed Jul. 20, 2012, the disclosures of which are incorporated herein by reference.

TECHNICAL FIELD

The present invention relates to a carbon-silicon composite, in which surfaces of silicon particles are coated with a carbon-based material that is doped with doping atoms, a method of preparing the same, and an anode active material including the carbon-silicon composite.

BACKGROUND ART

In line with recent miniaturization and lightweight trends in electronic devices, the miniaturization and weight reduction have also been required for batteries acting as a power source. Lithium-based secondary batteries have been commercialized as a battery that may be miniaturized, light weighted, and charged to high capacity, and the lithium-based secondary batteries have been used in portable electronic devices, such as small video cameras, mobile phones, and notebooks, and communication devices.

Lithium secondary batteries, as an energy storage device having high energy and power, may be advantageous in that capacities or operating voltages thereof are higher than those of other types of batteries. However, since the safety of the batteries may be problematic due to the high energy, there may be a risk of explosion or fire. In particular, since high energy and output characteristics are required for hybrid vehicles that have recently been in the spotlight, it may be considered that the safety is more important.

In general, a lithium secondary battery is composed of a cathode, an anode, and an electrolyte, in which charge and discharge may be possible, because lithium ions, which are discharged from a cathode active material by first charging, may act to transfer energy while moving between both electrodes, for example, the lithium ions are intercalated into an anode active material, i.e., carbon particles, and deintercalated during discharging.

Meanwhile, since there is a continuous need for high-capacity batteries due to the development of portable electronic devices, research into high-capacity anode materials, such as tin (Sn) and silicon (Si), which have significantly higher capacity per unit mass than that of carbon that is used as a typical anode material, have been actively conducted. In the case that Si or a Si alloy is used as an anode active material, volume expansion may increase and cycle characteristics may degrade. In order to address the above limitations, the Si or the Si alloy may be mixed with graphite to be used as the anode active material. However, since the graphite may be non-uniformly distributed during the mixing, the cycle characteristics and lifetime may degrade.

DISCLOSURE OF THE INVENTION

Technical Problem

The present invention provides a carbon-silicon composite having improved capacity and cycle stability that are caused by increasing electrical conductivity by coating a silicon-based anode active material with carbon.

The present invention also provides a method of preparing the carbon-silicon composite.

In addition, the present invention provides an anode active material including the carbon-silicon composite.

Furthermore, the present invention provides an anode including the anode active material and a secondary battery.

Technical Solution

According to an aspect of the present invention, there is provided a carbon-silicon composite, in which surfaces of silicon particles are coated with a carbon-based material that is doped with at least one type of doping atoms selected from the group consisting of nitrogen (N), phosphorous (P), boron (B), sodium (Na), and aluminum (Al).

According to another aspect of the present invention, there is provided a method of preparing a carbon-silicon composite including adding a carbon-based material, silicon particles, and a reducing agent to a solution, and heat treating a mixture obtained by the addition.

According to another aspect of the present invention, there is provided an anode active material including the carbon-silicon composite.

Also, according to another aspect of the present invention, there is provided an anode including the anode active material.

Furthermore, according to another aspect of the present invention, there is provided a secondary battery including the anode.

Advantageous Effects

According to the present invention, silicon particles may be coated with a carbon-based material in an in-situ process, and the electrical conductivity may be increased by uniformly coating the silicon particles with the carbon-based material by a simple method. Thus, capacity and cycle stability may be improved.

MODE FOR CARRYING OUT THE INVENTION

Hereinafter, the present invention will be described in detail.

The present invention provides a carbon-silicon composite, in which surfaces of silicon particles are coated with a carbon-based material that is doped with at least one type of doping atoms selected from the group consisting of nitrogen (N), phosphorous (P), boron (B), sodium (Na), and aluminum (Al).

Most materials are composed of a collection of many atoms and these atoms have predetermined regularity to one another, in which a material in regular arrangement is denoted as a crystal. However, an actual crystal is not perfect and may have various types of defects, in which the defects may affect physical and mechanical properties of the crystal.

First, there are various types of defects that do not form crystals, in which the defects may have a size ranging from atomic to micron scales. The type of the defects may be categorized as point defects (zero-dimensional defects), line defects (one-dimensional defects), planar defects (two-dimensional defects), and volume defects (three-dimensional defects). The doping atoms may be inserted or substituted into such defects of the carbon-based material.

The doping atoms may be included in an amount ranging from 3% to 8% based on carbon atoms of the carbon-based material. In the case that the amount of the doping atoms included based on the carbon atoms is less than 3%, the carbon-based material may not be sufficiently positively charged, and thus, the carbon-based material and the silicon particles may not be bound by electrostatic attraction. In the case in which the amount of the doping atoms is greater than 8%, since the carbon-based material may be in an excessively positively charged state, the surfaces of the silicon particles may be coated with an excessive amount of the carbon-based material. Thus, initial efficiency may be reduced.

Also, a thickness of the carbon-based material coated on the surfaces of the silicon particles may be in a range of 1 nm to 5 nm. In the case that the thickness is less than 1 nm, sufficient electrical conductivity may not be provided to the carbon-silicon composite. In the case in which the thickness is greater than 5 nm, the surfaces of the silicon particles are coated with the carbon-based material having a high specific surface area, and thus, battery efficiency may be reduced.

The present invention also provides a method of preparing a carbon-silicon composite including adding a carbon-based material, silicon particles, and a reducing agent to a solution, and heat treating a mixture obtained by the addition.

Figure 1:
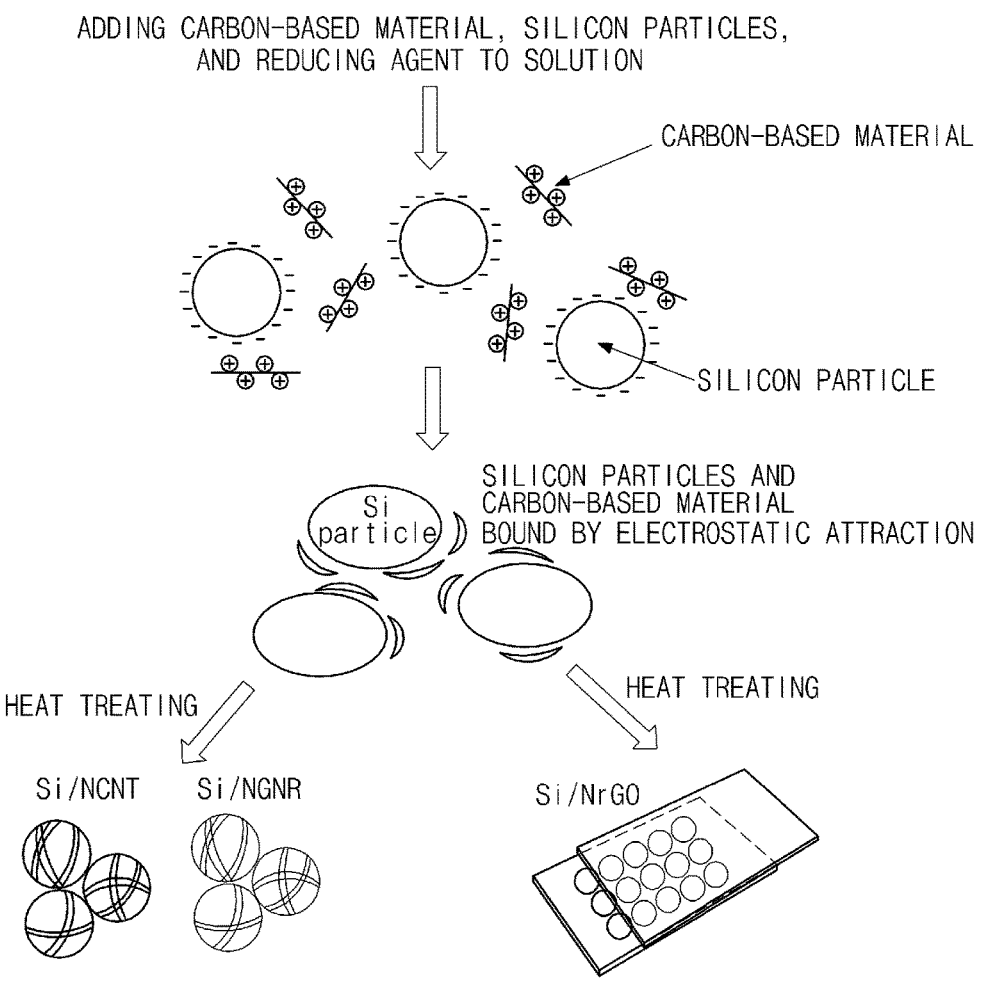
FIG. 1 is a schematic view illustrating a method of preparing a carbon-silicon composite according to an embodiment of the present invention.

FIG. 1 is a schematic view illustrating a method of preparing a carbon-silicon composite according to an embodiment of the present invention.

Referring to FIG. 1, the method of preparing a carbon-silicon composite according to the embodiment of the present invention may include adding a carbon-based material, silicon particles, and a reducing agent to a solution, and heat treating.

Specifically, the carbon-based material may be positively charged by being doped with the doping atoms due to the reducing agent. Since the surfaces of the silicon particles are easily oxidized to form a thin silicon oxide layer thereon, the surfaces thereof are negatively charged, and thus, the silicon particles and the carbon-based material are bound by electrostatic attraction. With respect to the carbon and silicon particles bound by the electrostatic attraction, the surfaces of the silicon particles are coated with the carbon-based material through the heat treatment.

In the case that the silicon particles are coated with the carbon-based material by using a typical surfactant, a non-conductive layer may exist between the silicon particles and the carbon-based material.

However, with respect to the carbon-silicon composite prepared by the method of preparing a carbon-silicon composite according to the embodiment of the present invention, since the non-conductive layer does not exist between the carbon-based material and the silicon particles and the carbon-based material and the silicon particles are bound by the electrostatic attraction, the surfaces of the silicon particles may be uniformly coated with the carbon-based material.

Oxygen atoms of the carbon-based material or defects of the carbon-based material are doped with the doping atoms due to the reducing agent and thus, the carbon-based material becomes positively charged. The doping atom may be any one selected from the group consisting of N, P, B, Na, and Al, or a mixture of two or more thereof.

The defects denote parts, in which constituent atoms are removed from or impurities are included in the crystal structure of the carbon-based material. For example, in the case that the reducing agent is hydrazine, a nitrogen-doped carbon-based material may be obtained as the oxygen atoms or the defects of the carbon-based material are reduced by the hydrazine, and the nitrogen-doped carbon-based material becomes positively charged.

Since the silicon particles are easily oxidized, oxygen atoms are bonded to the surfaces of the silicon particles, and thus, the silicon particles may also be oxidized silicon particles. With respect to the carbon and the silicon particles bound together by the electrostatic attraction, the surfaces of the silicon particles may be coated with the carbon-based material through the heat treatment (calcination).

Any one selected from the group consisting of graphene nanoribbon (GNR), carbon nanotube (CNT), and reduced graphene oxide, or a mixture of two or more thereof may be used as the carbon-based material. The graphene has a surface area of about 2,600 $m^2/g$ and an electron mobility ranging from 15,000 $cm^2/Vs$ to 200,000 $cm^2/Vs$, in which the graphene has relatively useful properties in comparison to other carbon materials. In particular, the electron transfer rate of graphene is close to the speed of light, and the reason for this is that electrons move like massless particles in the graphene.

The graphene may be prepared by a typical Scotch tape method, an epitaxy method using a silicon carbide insulator, a chemical method using a reducing agent, and a method using a metal catalyst. Also, since the carbon nanotube has excellent strength and high resistance to fracture, the deformation of a current collector due to the repetition of charging and discharging or external force may be prevented and the oxidation of the surface of the current collector in unusual environments, such as high temperature and overcharging, of a battery may be prevented. Thus, the safety of the battery may be significantly improved.

A diameter of the silicon particle is not particularly limited, but may be in a range of 1 nm to 100 nm.

Also, the carbon-based material may be included in an amount ranging from 5 wt % to 10 wt % of the silicon particles. In the case that the amount of the carbon-based material is less than 5 wt %, since the entire surfaces of the silicon particles are not coated with the carbon-based material, an effect of improving electrical conductivity may be insignificant. In the case in which the amount of the carbon-based material is greater than 10 wt %, the carbon-based material may be agglomerated, and thus, initial efficiency may be reduced and capacity may be decreased.

Any one selected from the group consisting of hydrazine, ammonia, sodium borohydride, sodium naphthalenide, sodium anthracenide, sodium benzophenone, sodium acenaphthylenide, ferrocene, lithium aluminium hydride, lithium tris(terbutoxy)aluminium hydride borane, 9-borabicyclo[3.3.1]nonane, and diisobutylaluminium hydride, or a mixture of two or more thereof may be used as the reducing agent.

At least one selected from the group consisting of water, distilled water, N-methyl-2-pyrrolidone (NMP), dimethyl sulfoxide (DMSO), acetonitrile, acetone, tetrahydrofuran (THF), diethyl ether, toluene, and 1,2-dichlorobenzene may be used as the solution. The distilled water may be tertiary distilled water, which is distilled using a film after distillation and then distilled using a semi-permeable membrane.

The solution may be alkalescent with a pH value ranging from 7 to 9. In the case that the pH value of the solution is less than 7, the silicon particles may not be negatively charged, and in the case in which the pH value is greater than 9, the carbon-based material doped with the doping atoms may not be positively charged.

The heat treatment may be performed at a temperature ranging from 350° C. to 750° C. In the case that the heat treatment temperature is less than 350° C., the removal of the solution and impurities may not be facilitated and the reduction of the carbon-based material may be insignificant. In the case in which the heat treatment temperature is greater than 750° C., crystallinity of the silicon particles may be changed.

Also, the method of preparing a carbon-silicon composite according to the embodiment of the present invention may further include filtering after the carbon-based material, the silicon particles, and the reducing agent are added to the solution. The filtering may be performed before the heat treatment. The filtering may be performed to separate the carbon and the silicon particles, which are bound together by the electrostatic attraction, from the solution.

Furthermore, the present invention provides an anode active material including the carbon-silicon composite prepared according to the method of preparing a carbon-silicon composite.

The carbon-silicon composite according to the embodiment of the present invention may be used as the anode active material and may also be used in a secondary battery by being mixed with a typically used anode active material. The typically used anode active material may be any one selected from the group consisting of graphite, soft carbon, hard carbon, and lithium titanium oxide, or a mixture of two or more thereof.

Also, the present invention provides a secondary battery including a cathode including a cathode active material; a separator; an anode including the anode active material; and an electrolyte.

The anode active material may be prepared as an anode. For example, the anode active material of the present invention is mixed with a binder, a solvent, and a conductive agent and a dispersant if necessary, and stirred to prepare a slurry. Then, a current collector may be coated with the slurry and pressed to prepare the anode.

Examples of the binder may be a vinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluoro rubber, or various copolymers.

N-methyl-2-pyrrolidone, acetone, or water may be used as the solvent.

The conductive agent is not particularly limited so long as it does not generate chemical changes in the battery as well as having conductivity. Examples of the conductive agent may be graphite such as natural graphite and artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; a conductive material such as a polyphenylene derivative, etc.

An aqueous-based dispersant or an organic dispersant, such as N-methyl-2-pyrrolidone, may be used as the dispersant.

Similar to the preparation of the anode, a cathode active material, a conductive agent, a binder, and a solvent are mixed to prepare a slurry, and then a cathode may be prepared by directly coating a metal collector with the slurry or by casting the slurry on a separate support and laminating a cathode active material film separated from the support on a metal collector.

Examples of the cathode active material may be a layered compound, such as lithium cobalt oxide ($LiCoO_2$) or lithium nickel oxide ($LiNiO_2$), or a compound substituted with one or more transition metals; lithium manganese oxides such as $Li_{1+y}Mn_{2-y}O_4$ (where y is 0 to 0.33), $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; nickel (Ni)-site type lithium nickel oxide expressed by a chemical formula of $LiNi_{1-x}M_xO_2$ (where M is cobalt (Co), manganese (Mn), Al, copper (Cu), iron (Fe), magnesium (Mg), B, or gallium (Ga), and y is 0.01 to 0.3); lithium manganese complex oxide expressed by a chemical formula of $LiMn_{2-y}M_yO_2$ (where M is Co, Ni, Fe, chromium (Cr), zinc (Zn), or tantalum (Ta), and y is 0.01 to 0.1) or $Li_2Mn_3MO_8$ (where M is Fe, Co, Ni, Cu, or Zn); and $LiMn_2O_4$ having a part of lithium (Li) being substituted with alkaline earth metal ions. However, the cathode active material is not limited thereto.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or by being laminated as the separator. A typical porous nonwoven fabric, for example, a nonwoven fabric formed of high melting point glass fibers or polyethylene terephthalate fibers may be used, but the separator is not limited thereto.

In an electrolyte solution used in the present invention, a lithium salt, which may be included as the electrolyte, may be used without limitation so long as it is typically used in an electrolyte solution for a secondary battery. For example, any one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ or a mixture of two or more thereof may be used as an anion of the lithium salt.

In the electrolyte solution used in the present invention, an organic solvent included in the electrolyte solution may be used without limitation so long as it is typically used, and typically, any one selected from the group consisting of propylene carbonate, ethylene carbonate, diethyl carbonate, dimethyl carbonate, ethylmethyl carbonate, methylpropyl carbonate, dipropyl carbonate, dimethyl sulfoxide, acetonitrile, dimethoxyethane, diethoxyethane, vinylene carbonate, sulfolane, γ-butyrolactone, propylene sulfite, and tetrahydrofuran, or a mixture of two or more thereof may be used.

In particular, ethylene carbonate and propylene carbonate, ring-type carbonates among the carbonate-based organic solvents, well dissociate the lithium salt in the electrolyte solution due to high dielectric constants as high-viscosity organic solvents, and thus, the ring-type carbonate may be used. Since an electrolyte solution having high electrical conductivity may be prepared when the ring-type carbonate is mixed with low-viscosity, low-dielectric constant linear carbonate, such as dimethyl carbonate and diethyl carbonate, in an appropriate ratio, the ring-type carbonate, for example, may be used.

Selectively, the electrolyte solution stored according to the present invention may further include an additive, such as an overcharge inhibitor, included in a typical electrolyte solution.

A separator is disposed between the cathode and the anode to form a battery structure, the battery structure is wound or folded to put in a cylindrical battery case or prismatic battery case, and then a secondary battery is completed when the electrolyte is injected thereinto. Also, the battery structure is stacked in a bi-cell structure, impregnated with the electrolyte solution, and a secondary battery is then completed when the product thus obtained is put in a pouch and sealed.

Hereinafter, the present invention will be described in detail according to specific examples. The invention may, however, be embodied in many different forms and should not be construed as being limited to the embodiments set forth herein.

Example 1: Preparation 1 of Carbon-Silicon Composite (Si/NCNT)

Carbon nanotubes, as a carbon-based material, and silicon nanoparticles were introduced into tertiary distilled water and hydrazine was then added thereto to prepare an alkaline aqueous solution with a pH value of 8. Nitrogen-doped carbon nanotubes were prepared as terminal oxygen atoms or defects of the carbon nanotubes were reduced by the hydrazine. The nitrogen-doped carbon nanotubes were positively charged and the silicon nanoparticles were negatively charged in the alkaline aqueous solution with a pH value of 8, and thus, the nitrogen-doped carbon nanotubes and the silicon nanoparticles were bound together by electrostatic attraction. Carbon-silicon particles bound by the electrostatic attraction were separated from the aqueous solution by filtration, and the carbon-silicon particles were heat treated at 500° C. to prepare a carbon-silicon composite having a core-shell structure, in which surfaces of the silicon particles were coated with the carbon nanotubes.

Example 2: Preparation 2 of Carbon-Silicon Composite (Si/NGNR)

A carbon-silicon composite was prepared in the same manner as Example 1 except that graphene nanoribbons were used as a carbon-based material.

Example 3: Preparation 3 of Carbon-Silicon Composite (Si/NrGO)

A carbon-silicon composite was prepared in the same manner as Example 1 except that reduced graphene oxide was used as a carbon-based material.

Comparative Examples 1 to 3

A reducing agent was not used, and silicon nanoparticles and reduced graphene oxide, silicon nanoparticles and carbon nanotubes, and silicon nanoparticles and graphene nanoribbons were used to respectively prepare a reduced graphene oxide-silicon composite (Si/rGO), a carbon nanotube-silicon composite (Si/CNT), and a graphene nanoribbon-silicon composite (Si/GNR), which were not doped with nitrogen.

Lithium Secondary Battery Preparation

Examples 4 to 6

Carbon-silicon composites prepared in Examples 1 to 3 were respectively used as an anode active material. Each anode active material of Examples 1 to 3, a conductive agent including acetylene black, and a binder including polyvinylidene fluoride were used and mixed at a weight ratio of 88:2:10. The mixture was then mixed with N-methyl-2-pyrrolidone to prepare a slurry. One surface of a copper current collector was coated with the prepared slurry to a thickness of 65 μm, and then dried and rolled. Then, anodes were prepared by punching into a predetermined size.

$LiPF_6$ was added to a non-aqueous electrolyte solvent prepared by mixing ethylene carbonate and diethyl carbonate at a volume ratio of 30:70 to prepare a 1 M $LiPF_6$ non-aqueous electrolyte solution.

A lithium foil was used as a counter electrode, and a polyolefin separator was disposed between both electrodes. Then, coin-type secondary batteries were prepared by injecting the electrolyte solution.

Comparative Examples 4 to 6

Lithium secondary batteries were prepared in the same manner as Examples 4 to 6 except that the reduced graphene oxide-silicon composite (Si/rGO), the carbon nanotube-silicon composite (Si/CNT), and the graphene nanoribbon-silicon composite (Si/GNR), which were not doped with nitrogen and prepared in Comparative Examples 1 to 3, were respectively used as an anode active material.

Comparative Example 7

A secondary battery was prepared in the same manner as Examples 4 to 6 except that silicon was used as an anode active material.

Figure 2:
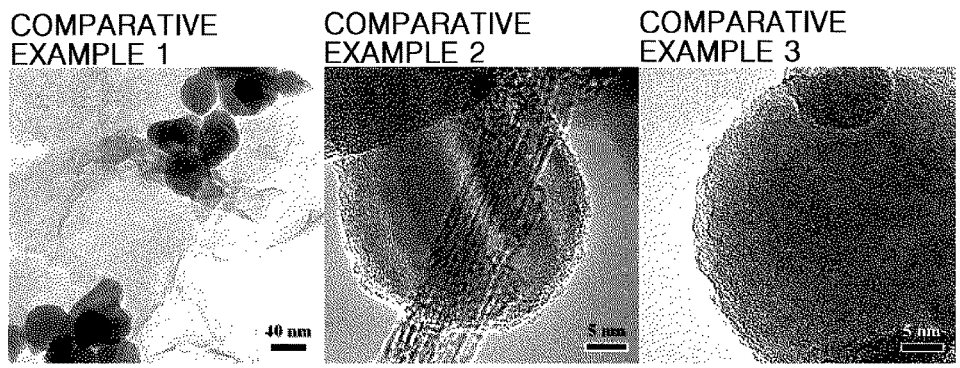
FIG. 2 is scanning electron microscope (SEM) micrographs of carbon-silicon composites that are doped with nitrogen and prepared in Examples 1 to 3 according to the present invention, and carbon-silicon composites that are not doped with nitrogen and prepared in Comparative Examples 1 to 3.
Figure 2:
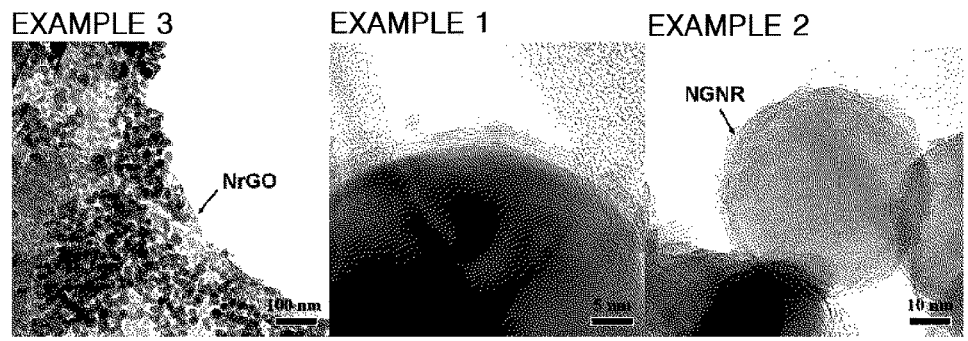

Experimental Example 1: Surface and Internal Analysis of Carbon-Silicon Composite FIG. 2 is scanning electron microscope (SEM) micrographs of carbon-silicon composites that were prepared in Examples 1 to 3 according to the present invention and Comparative Examples 1 to 3.

As illustrated in FIG. 2(a), with respect to the reduced graphene oxide-silicon composite (Si/rGO), the carbon nanotube-silicon composite (Si/CNT), and the graphene nanoribbon-silicon composite (Si/GNR) which were not doped with nitrogen and prepared in Comparative Examples 1 to 3, it may be understood that since carbon not doped with nitrogen has almost no wettability to the solution, silicon particles were sparsely coated with the carbon.

As illustrated in FIG. 2(b), with respect to the carbon-silicon composites of Examples 1 to 3 of the present invention, it may be understood that since carbon-based materials doped with doping atoms (N, P, B, Na, or Al) were used in the manufacturing of the carbon-silicon composites, the surfaces of silicon particles were uniformly coated with the carbon-based materials.

Figure 3:
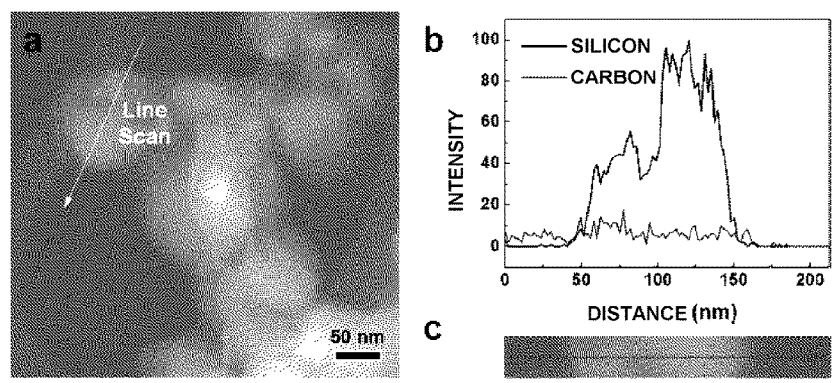
FIG. 3 is transmission electron microscope (TEM) micrographs and energy dispersive X-ray spectroscopy (EDS) results of the carbon-silicon composite prepared in Example 2 according to the present invention.

FIG. 3 is transmission electron microscope (TEM) micrographs (a and c of FIG. 3) and energy dispersive X-ray spectroscopy (EDS, b of FIG. 3) results of the carbon-silicon composite (Si/NGNR) prepared in Example 2 according to the present invention. Herein, c of FIG. 3 illustrates original data of a line profile in a of FIG. 3, and the results of EDS analysis on c are illustrated in b of FIG. 3.

Referring to FIG. 3, it may be understood that the formation of the carbon-silicon composite was identified by the TEM micrographs, and it may be confirmed by the EDS analysis that the carbon-silicon composite (Si/NGNR) prepared in Example 2 was composed of carbon and silicon.

Figure 4:
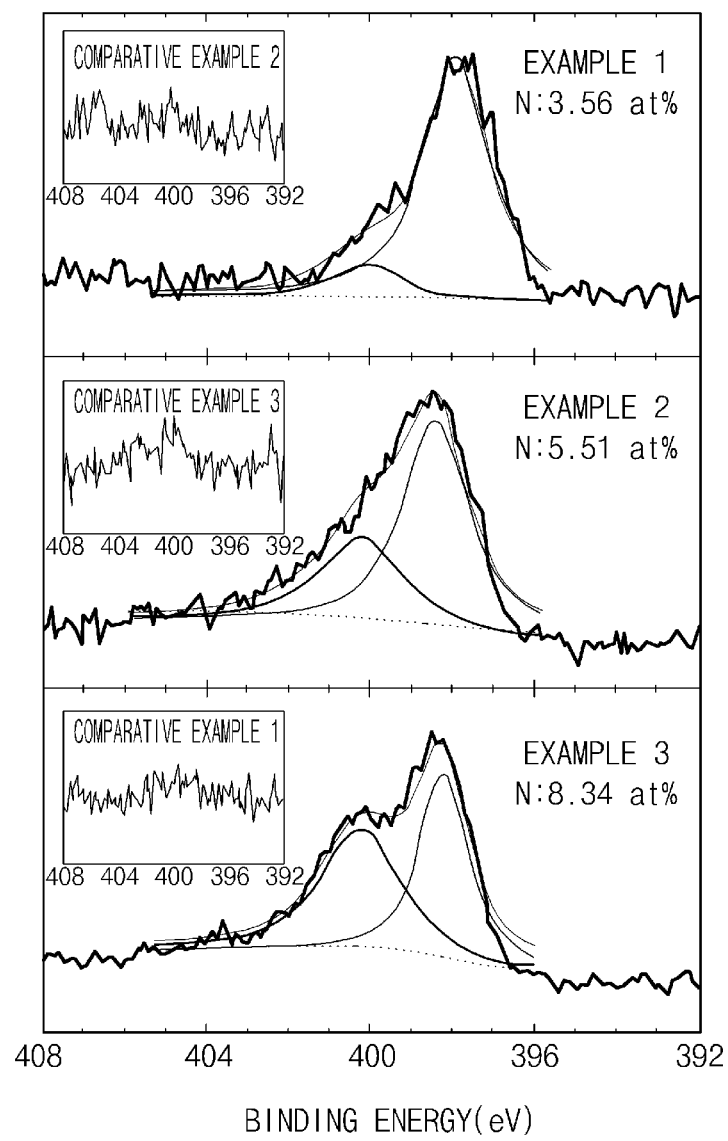
FIG. 4 is a graph illustrating nitrogen doping concentrations of the carbon-silicon composites prepared in Examples 1 to 3 according to the present invention.

FIG. 4 is a graph illustrating nitrogen doping concentrations of the carbon-silicon composites prepared in Examples 1 to 3 according to the present invention.

Referring to FIG. 4, it may be confirmed that the carbon-silicon composites prepared in Examples 1 to 3 respectively contained 3.56 at %, 5.51 at %, and 8.34 at % of nitrogen (In FIG. 4, the unit "at %" denotes the percentage (atomic %) of nitrogen atoms). In contrast, no peak was shown in Comparative Examples 1 to 3, and thus, it may be confirmed that nitrogen was not contained.

Experimental Example 2: Capacity and Cycle Stability Analysis of Secondary Battery Charge and discharge experiments were performed at constant current by using the secondary batteries prepared in Examples 4 to 6 and Comparative Example 7. A voltage region of 0 to 1.5 V (vs. Li/Li$^+$) was used during the charge and discharge experiments.

In this case, constant current (CC)/constant voltage (CV) charge and CC discharge were performed at a current value (0.1 C) of 3.0 mAh, and the CV mode was performed under a cut-off condition of 5 mV.

Figure 5:
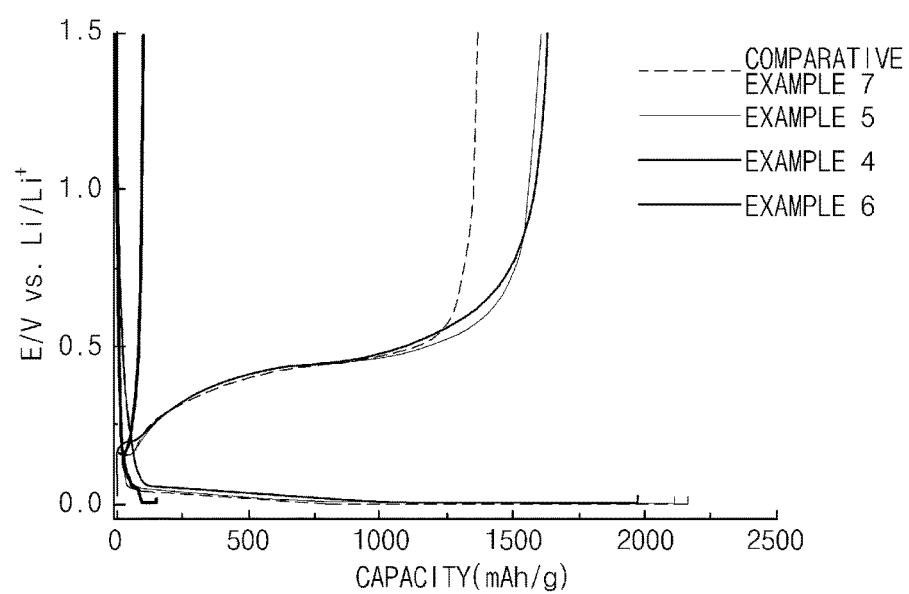
FIGS. 5 and 6 are graphs illustrating capacity characteristics of secondary batteries prepared in Examples 4 to 6 according to the present invention and Comparative Example 7.
Figure 6:
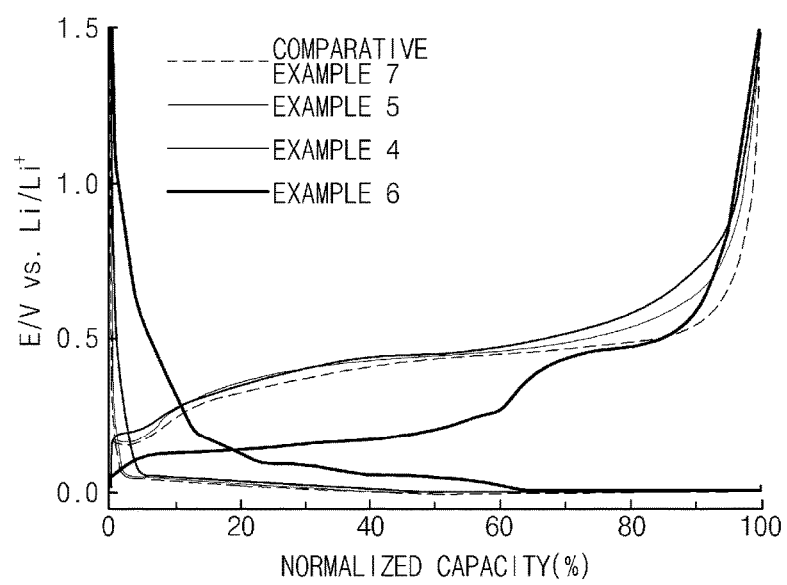

FIGS. 5 and 6 are graphs illustrating capacities of the secondary batteries prepared in Examples 4 to 6 according to the present invention and Comparative Example 7. Specifically, FIG. 5 illustrates the capacities of the secondary batteries prepared in Examples 4 to 6 according to the present invention and Comparative Example 7, and FIG. 6 illustrates normalized capacities of the secondary batteries prepared in Examples 4 to 6 according to the present invention and Comparative Example 7.

As illustrated in FIGS. 5 and 6, it may be understood that the capacities of the secondary batteries of Examples 4 to 6 according to the present invention were significantly increased in comparison to the secondary battery having an anode active material composed of silicon as in Comparative Example 7.

Figure 7:
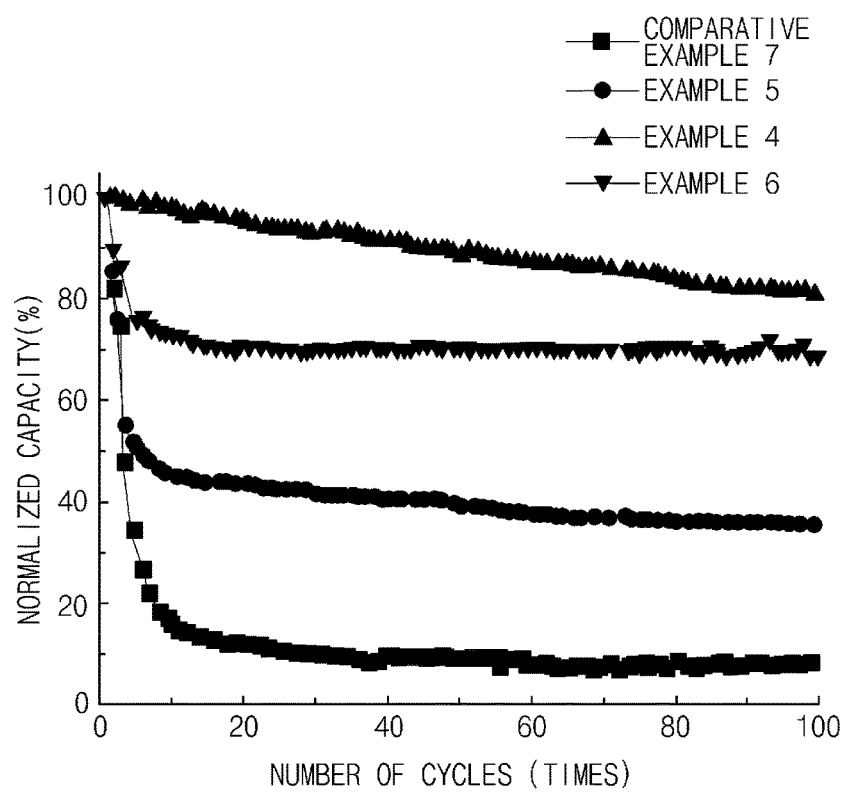
FIG. 7 is a graph illustrating cycle stability characteristics of the secondary batteries prepared in Examples 4 to 6 according to the present invention and Comparative Example 7.

FIG. 7 is a graph illustrating cycle stabilities of the secondary batteries prepared in Examples 4 to 6 according to the present invention and Comparative Example 7.

As illustrated in FIG. 7, it may be understood that the normalized capacity of the secondary battery of Example 7 was lower than those of the secondary batteries of Examples 4 to 6 according to the present invention. It may be understood that the normalized capacity of the secondary battery of Example 4 according to the present invention was the highest and the normalized capacity of the secondary battery of Example 6 was the next highest. It may also be understood that the secondary batteries of Examples 4 to 6 according to the present invention maintained higher normalized capacities in comparison to the secondary battery of Comparative Example 7 even in the case in which the number of charge and discharge cycles was increased.

INDUSTRIAL APPLICABILITY

According to the present invention, silicon particles may be coated with a carbon-based material in an in-situ process, and the electrical conductivity may be increased by uniformly coating the silicon particles with the carbon-based material by a simple method. Thus, capacity and cycle stability may be improved.

The invention claimed is:

1. A carbon-silicon composite, comprising silicon particles and a carbon-based material on surfaces of the silicon particles,
    wherein the carbon-based material comprises defects that are doped with at least one type of doping atoms,
    wherein the at least one type of doping atoms are selected from the group consisting of nitrogen (N), phosphorous (P), boron (B), sodium (Na), and aluminum (Al),
    wherein a thickness of the carbon-based material coated on the surfaces of the silicon particles is in a range of 1 nm to 5 nm, and
    wherein the carbon-based material is included in an amount ranging from 5 wt % to 10 wt % of the silicon particles.

2. The carbon-silicon composite of claim 1, wherein the doping atoms are included in an amount ranging from 3% to 8% based on carbon atoms of the carbon-based material.

3. The carbon-silicon composite of claim 1, wherein the carbon-based material is any one selected from the group consisting of graphene nanoribbons, carbon nanotubes, and reduced graphene oxide, or a mixture of two or more thereof.

4. A method of preparing the carbon-silicon composite of claim 1, the method comprising:
    adding a carbon-based material, silicon particles, and a reducing agent to a solution; and
    heat treating a mixture obtained by the addition.

5. The method of claim 4, wherein the carbon-based material is positively charged and the silicon particles are negatively charged to be bound by mutual electrostatic attraction.

6. The method of claim 4, wherein the carbon-based material is any one selected from the group consisting of graphene nanoribbons, carbon nanotubes, and reduced graphene oxide, or a mixture of two or more thereof.

7. The method of claim 4, wherein a diameter of the silicon particle is in a range of 1 nm to 100 nm.

8. The method of claim 4, wherein the reducing agent is any one selected from the group consisting of hydrazine, ammonia, sodium borohydride, sodium naphthalenide, sodium anthracenide, sodium benzophenone, sodium acenaphthylenide, ferrocene, lithium aluminium hydride, lithium tris(terbutoxy)aluminium hydride borane, 9-borabicyclo[3.3.1]nonane, and diisobutylaluminium hydride, or a mixture of two or more thereof.

9. The method of claim 4, wherein the solution is any one selected from the group consisting of water, distilled water, N-methyl-2-pyrrolidone (NMP), dimethyl sulfoxide (DMSO), acetonitrile, acetone, tetrahydrofuran (THF), diethyl ether, toluene, and 1,2-dichlorobenzene, or a mixture of two or more thereof.

10. The method of claim 4, wherein the solution is alkalescent with a pH value ranging from 7 to 9.

11. The method of claim 4, wherein the heat treatment is performed at a temperature ranging from 350° C. to 750° C.

12. The method of claim 4, further comprising filtering the mixture between the adding to the solution and the heat treating.

13. An anode active material comprising the carbon-silicon composite of claim 1.

14. An anode comprising the anode active material of claim 13.

15. A secondary battery comprising the anode of claim 14.

* * * * *